(12) United States Patent
Liu et al.

(10) Patent No.: US 11,843,283 B2
(45) Date of Patent: Dec. 12, 2023

(54) ROTOR SHEET

(71) Applicant: Hefei JEE Power Systems Co., Ltd., Hefei (CN)

(72) Inventors: Lei Liu, Hefei (CN); Renzhong Zhang, Hefei (CN); Kun Fan, Hefei (CN)

(73) Assignee: Hefei JEE Power Systems Co., Ltd., Hefei (CN)

( * ) Notice: Subject to any disclaimer, the term of this patent is extended or adjusted under 35 U.S.C. 154(b) by 133 days.

(21) Appl. No.: 17/338,945

(22) Filed: Jun. 4, 2021

(65) Prior Publication Data

US 2022/0278572 A1 Sep. 1, 2022

(30) Foreign Application Priority Data

Feb. 26, 2021 (CN) .......................... 202110218057.9

(51) Int. Cl.
  *H02K 1/27* (2022.01)
  *H02K 1/276* (2022.01)
(52) U.S. Cl.
  CPC .................... *H02K 1/276* (2013.01)
(58) Field of Classification Search
  CPC .. H02K 1/276; H02K 1/2766; H02K 2213/03; H02K 2201/03; Y02T 10/64
  USPC .................................................... 310/156.56
  See application file for complete search history.

(56) References Cited

U.S. PATENT DOCUMENTS

| | | | | | |
|---|---|---|---|---|---|
| 5,864,191 | A | * | 1/1999 | Nagate | H02K 1/276 310/216.106 |
| 6,087,752 | A | * | 7/2000 | Kim | H02K 1/2766 310/156.56 |
| 7,843,101 | B2 | * | 11/2010 | Ito | H02K 1/28 417/423.1 |
| 8,546,990 | B2 | * | 10/2013 | Suzuki | H02K 1/2766 310/156.53 |
| 9,231,445 | B2 | * | 1/2016 | Sano | H02K 1/2766 |
| 9,236,775 | B2 | * | 1/2016 | Takahashi | H02K 21/14 |
| 10,476,326 | B2 | * | 11/2019 | Heo | H02K 21/14 |

(Continued)

FOREIGN PATENT DOCUMENTS

| | | | | | |
|---|---|---|---|---|---|
| CN | 110100374 | A | * | 8/2019 | .......... H02K 1/2766 |
| CN | 111654133 | A | | 9/2020 | |

(Continued)

*Primary Examiner* — Alex W Mok
(74) *Attorney, Agent, or Firm* — Bayramoglu Law Offices LLC

(57) ABSTRACT

A rotor sheet includes a sheet body. The sheet body includes a plurality of magnetic poles symmetrically distributed in a circumferential direction of the sheet body. Each magnetic pole includes one first magnet groove symmetrical about a D-axis center line, two second magnet grooves symmetrically distributed in an approximate V shape about the D-axis center line, two first air grooves symmetrically distributed on the outer sides of two ends of the first magnet groove, and one second air groove positioned between the ends of the two second magnet grooves near the side of the center of the sheet body. First magnetic bridges are formed between the first air grooves and an excircle of the sheet body, and second magnetic bridges are formed between the first magnet groove and the first air grooves; and third magnetic bridges are formed between the excircle of the sheet body.

20 Claims, 5 Drawing Sheets

(56) References Cited

U.S. PATENT DOCUMENTS

| | | | | |
|---|---|---|---|---|
| 2007/0126304 | A1* | 6/2007 | Ito | H02K 1/28 310/156.53 |
| 2010/0277027 | A1* | 11/2010 | Kaiser | H02K 1/276 310/156.47 |
| 2012/0194026 | A1* | 8/2012 | Matsuoka | H02K 1/2766 310/156.53 |
| 2012/0200193 | A1* | 8/2012 | Sano | H02K 1/2766 310/216.106 |
| 2012/0256508 | A1* | 10/2012 | Suzuki | H02K 1/2766 310/156.38 |
| 2013/0307363 | A1* | 11/2013 | Sano | H02K 1/27 310/156.01 |
| 2018/0205274 | A1* | 7/2018 | Heo | H02K 1/24 |
| 2018/0254677 | A1* | 9/2018 | Shibamori | H02K 1/27 |
| 2019/0074738 | A1* | 3/2019 | Yabe | H02K 15/03 |
| 2020/0021153 | A1* | 1/2020 | Saito | H02K 1/2766 |
| 2020/0127511 | A1* | 4/2020 | Matsubara | H02K 1/16 |
| 2020/0177039 | A1* | 6/2020 | Torrey | H02K 1/30 |

FOREIGN PATENT DOCUMENTS

| | | | | |
|---|---|---|---|---|
| JP | 2020150772 | A | * | 9/2020 |
| JP | 2021023063 | A | * | 2/2021 |
| JP | 2021027769 | A | * | 2/2021 |

* cited by examiner

ROTOR SHEET

CROSS REFERENCE TO THE RELATED APPLICATIONS

This application is based upon and claims priority to Chinese Patent Application No. 202110218057.9 filed on Feb. 26, 2021, the entire contents of which are incorporated herein by reference.

TECHNICAL FIELD

The present invention relates to the field of new energy vehicle motors, in particular to a rotor sheet.

BACKGROUND

A permanent magnet synchronous motor (PMSM), as the most important type of driving motors for new energy vehicles, has the outstanding advantages of high efficiency and high performance. As the new energy vehicles are demanding more and more on the cost, muting and rotational speed of the driving motor, an electromagnetism solution with high efficiency, high performance, low noise, high rotational speed and low cost will become the difficulty in its future design.

As a core component of the PMSM, a rotor sheet directly determines the key indicators such as performance, cost and noise of a motor solution. However, a traditional rotor sheet of a permanent magnet motor often cannot take into account all the above key indicators.

The disclosed Patent Document 1 (CN111654133A) discloses a motor rotor sheet and a motor rotor assembly system. The motor rotor sheet includes a rotor sheet body with a plurality of groups of magnet grooves, a plurality of groups of auxiliary grooves and a plurality of harmonic elimination holes formed therein; the plurality of groups of magnet grooves is arranged at intervals in a circumferential direction of the rotor sheet body; each group of magnet grooves include a first magnet groove and a second magnet groove that are sequentially arranged at intervals from an edge to the center of the rotor sheet body, and the second magnet groove includes a first section and a second section between which magnetic bridges are provided; the plurality of groups of auxiliary grooves is arranged to correspond to the plurality of groups of magnet grooves, and each group of auxiliary grooves include two slots correspondingly located at two ends of one first magnet groove; and the plurality of harmonic elimination holes is correspondingly arranged between every two adjacent first magnet grooves.

In the motor rotor sheet solution of Patent Document 1, the rotor sheet body is provided with the magnet grooves, the auxiliary grooves, the magnetic bridges and the harmonic elimination holes. Owing to the design of the distribution modes of the magnet grooves, the auxiliary grooves, the magnetic bridges and the harmonic elimination holes, the strength of the motor rotor sheet is improved. In the case that the demands on motor power and torque performance are met, the problems of low strength and high risk caused by a temperature rise in the motor rotor and a decrease in the yield strength of the rotor sheet during continuous high-speed rotation of the motor are solved, but high efficiency, low noise, high rotational speed and low cost cannot be taken into account.

SUMMARY

An objective of the present invention is to provide a rotor sheet with high efficiency, high performance, low noise, high rotational speed and low cost in view of the design of a rotor sheet.

The technical solutions of the present invention are described as below.

A rotor sheet includes a sheet body, the sheet body including a plurality of magnetic poles symmetrically distributed in a circumferential direction of the sheet body, wherein each magnetic pole includes one first magnet groove, two second magnet grooves, two first air grooves and one second air groove;

the first magnet groove is symmetrical about a D-axis center line, and a first magnet is installed in the first magnet groove; the two first air grooves are symmetrically distributed on the outer sides of two ends of the first magnet groove; first magnetic bridges are formed between the first air grooves and an excircle of the sheet body, and second magnetic bridges are formed between the first magnet groove and the first air grooves; and the two second magnet grooves are symmetrically distributed in an approximate V shape about the D-axis center line, and a second magnet is installed in the two second magnet grooves respectively; the second air groove is positioned between the ends of the two second magnet grooves near the side of the center of the sheet body; third magnetic bridges are formed between the excircle of the sheet body and the ends of the second magnet grooves near the outer circumference of the sheet body, and fourth magnetic bridges are formed between the second air groove and the ends of the second magnet grooves near the side of the center of the sheet body.

Preferably, each first air groove has four side edges, in which the side edge adjacent to the excircle of the sheet body is an arc line segment concentric with the excircle of the sheet body, and this side edge and the excircle of the sheet body form the first magnetic bridges having an equal width; and the side edges of the first air grooves, which are adjacent to the first magnet groove, are parallel to each other to form the second magnetic bridges having an equal width.

Preferably, an angle between the second magnetic bridge and a long edge of the first magnet ranges from 130° to 140°.

Preferably, the angle between the second magnetic bridge and the long edge of the first magnet ranges from 132° to 137°.

Preferably, the angle between the second magnetic bridge and the long edge of the first magnet is 135°.

Preferably, the side edge, adjacent to the excircle of the sheet body, on the end of each second magnet groove near the outer circumference of the sheet body is an arc line segment concentric with the excircle of the sheet body, and the side edge on the end of the second magnet groove near the side of the center of the sheet body and the excircle of the sheet body form third magnetic bridges having an equal width.

Preferably, an angle between a connecting line from an outermost point of the second magnet groove to a central point of a sheet and the D-axis center line ranges from 20° to 21°.

Preferably, the angle between the connecting line from the outermost point of the second magnet groove to the central point of the sheet and the D-axis center line ranges from 20.5° to 21°.

Preferably, the second air groove is of a trapezoidal structure and is symmetrical about the D-axis center line, and an angle between two side edges of the second air groove ranges from 0 to 10°; and side edges of the second magnet groove, which are adjacent to the second air groove, are parallel to each other to form fourth magnetic bridges having an equal width.

Preferably, the angle between the two side edges of the second air groove is 5°.

Preferably, the width of the first magnetic bridges is equal to that of the second magnetic bridges, and the width of the fourth magnetic bridges is 1.4 to 1.6 times of that of the third magnetic bridges.

Preferably, two rotor surface grooves are also formed in an outer circumference of the rotor sheet on the outer side of each magnetic pole, and the two rotor surface grooves are symmetrically distributed about the D-axis center line.

Preferably, an angle between a connecting line from a midpoint of each rotor surface groove to a central point of the sheet body and the D-axis center line ranges from 12.5° to 13°; and the rotor surface groove has a depth that is 0.4% to 0.6% of a radius of the sheet body, and a width that is 2% to 4% of the radius of the sheet body.

Preferably, line segment joints of all side edges of the first magnet grooves, the second magnet grooves, the first air grooves, the second air groove and the rotor surface grooves are of fillet structures.

The rotor sheet of the present invention has the following advantages.

Owing to the innovative design, the rotor sheet provided by the present invention has the remarkable advantages of high efficiency, high performance, low noise, high rotational speed and low cost.

(1) The second air groove is located between the ends of the two second magnet grooves near the side of the center of the sheet body, which can effectively reduce a D-axis inductance without any impact on a Q-axis inductance, so that a salient pole ratio of the rotor is obviously larger than that of a conventional rotor. Thus, the design objectives of high performance and low cost can be achieved.

(2) Each rotor surface groove is designed into the fillet structure, and the depth and the width of the groove are designed, so that a harmonic electromagnetic force can be effectively reduced without any adverse impact on the motor performance.

(3) The angle between the connecting line from the outermost point of each second magnet groove to the central point of the sheet and the D-axis center line is well designed to effectively reduce the stress of the third magnetic bridges, so that the width of the third magnetic bridges and the flux leakage of the magnets can be reduced, and the use ratio of the magnets can be increased.

(4) By designing a width ratio of the fourth magnetic bridges to the third magnetic bridges and the angle between two side edges of the fourth magnetic bridges, within the meaning of the reasonable design of the angle between the connecting line from the outermost point of each second magnet groove to the central point of the sheet and the D-axis center line, the third magnetic bridges and the fourth magnetic bridges may have equivalent stress, thereby avoiding material waste caused by the fact that one magnetic bridge has excessively large stress while the other has excessively small stress.

(5) The angle between the second magnetic bridges and the long edge of the first magnet is designed to reduce the stress at the second magnetic bridges and to reduce the width of the magnetic bridges on the premise of keeping the performance unchanged. Therefore, the flux leakage of the magnets is reduced, and the use ratio of the magnets is increased.

BRIEF DESCRIPTION OF THE DRAWINGS

The present invention will be further described with reference to the accompanying drawings and embodiments.

Figure 1:
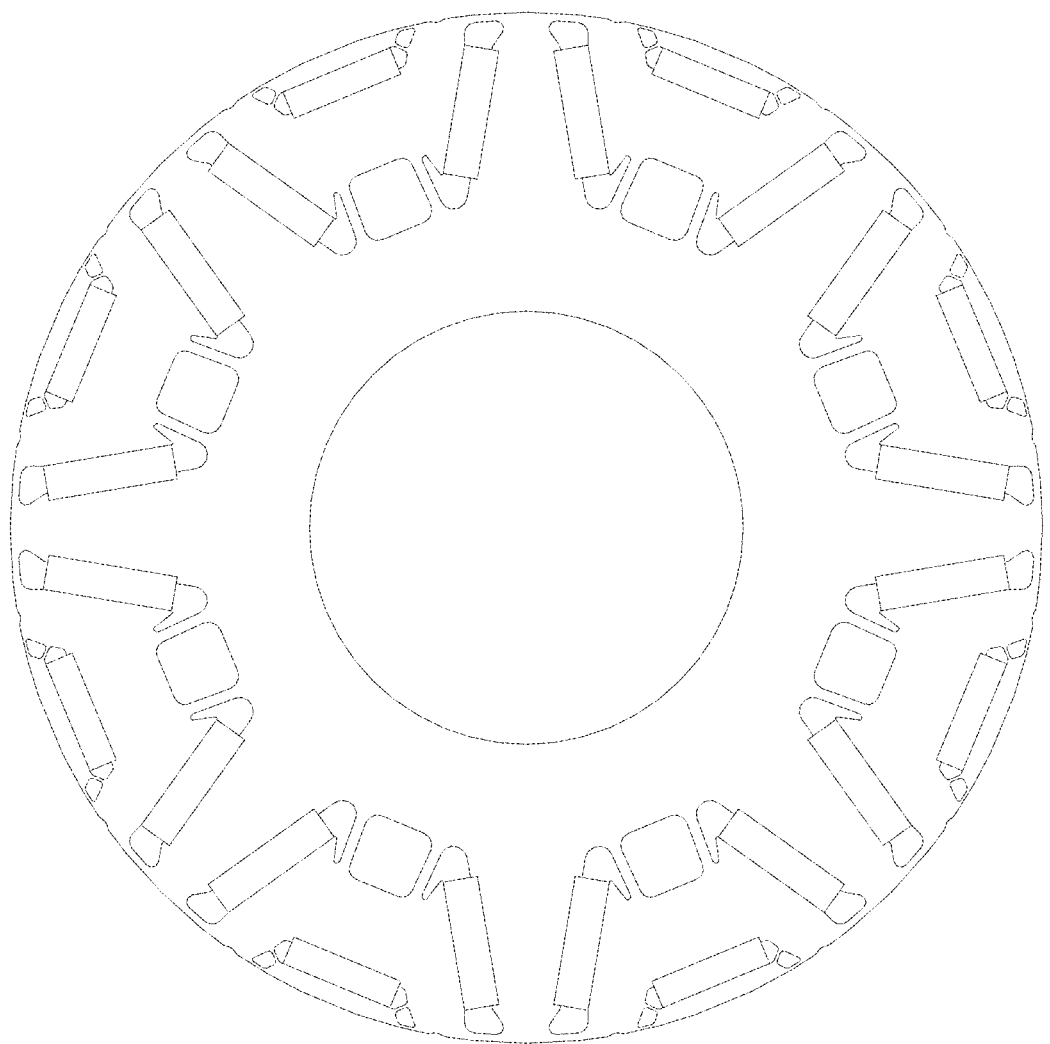
FIG. 1 is an overall schematic diagram of a rotor sheet.

Reference numbers in the drawings are described as below: 1—first magnet; 2—first magnet groove; 3—second magnet; 4—second magnet groove; 5—first air groove; 6—second air groove; 7—rotor surface groove; 8—first magnetic bridge; 9—second magnetic bridge; 10—third magnetic bridge; 11—fourth magnetic bridge; 12—D-axis center line; 13—angle between second magnetic bridge and long edge of first magnet; and 14—angle between connecting line from outermost point of second magnet groove to central point of sheet and D-axis center line.

DETAILED DESCRIPTION OF THE EMBODIMENTS

To make technical solutions and advantages of the present invention clearer, the present invention will be further described below with reference to the accompanying drawings.

Figure 2:
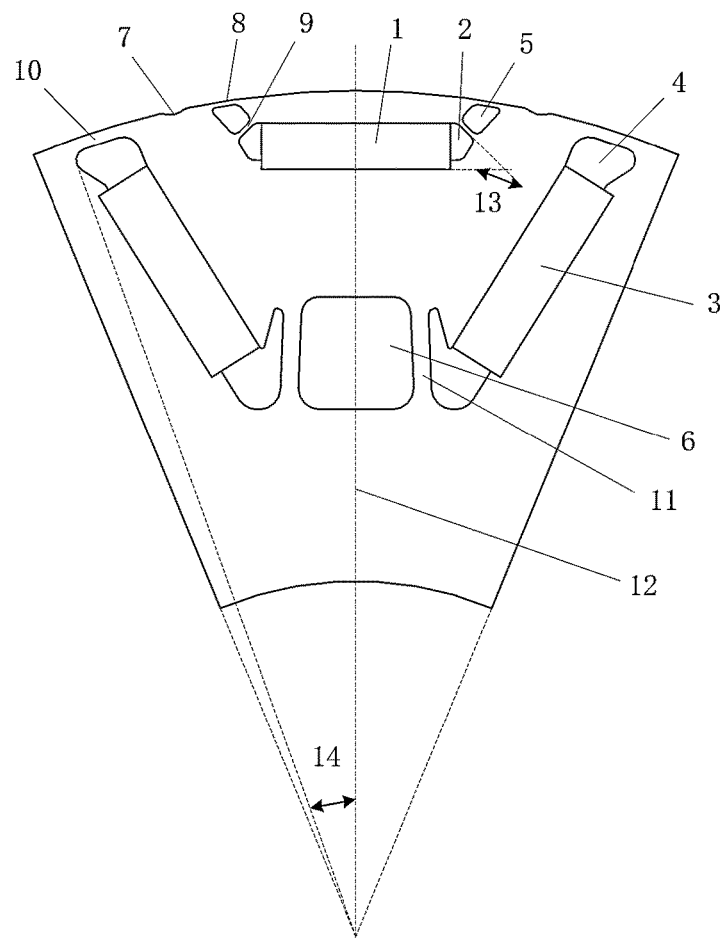
FIG. 2 is a schematic diagram of one magnetic pole of the rotor sheet.

As shown in FIG. 1 and FIG. 2, the present invention provides a rotor sheet. The rotor sheet structure includes a sheet body. The sheet body includes a plurality of magnetic poles symmetrically distributed in a circumferential direction of the sheet body, wherein each magnetic pole includes one first magnet groove 2, two second magnet grooves 4, two first air grooves 5 and one second air groove 6.

The first magnet groove 2 is symmetrical about a D-axis center line 12, and a first magnet 1 is installed in the first magnet groove 2. The two first air grooves 5 are symmetrically distributed on the outer sides of two ends of the first magnet groove 2. First magnetic bridges 8 are formed between the first air grooves 5 and an excircle of the sheet body, and second magnetic bridges 9 are formed between the first magnet groove 2 and the first air grooves 5.

The two second magnet grooves 4 are symmetrically distributed in an approximate V shape about the D-axis center line 12, and a second magnet 3 is installed in the two second magnet grooves 4 respectively. The second air groove 6 is positioned between the ends of the two second magnet grooves 4 near the side of the center of the sheet body. Third magnetic bridges 10 are formed between the excircle of the sheet body and the ends of the second magnet grooves 4 near the outer circumference of the sheet body, and fourth magnetic bridges 11 are formed between the second air groove 6 and the ends of the second magnet grooves 4 near the side of the center of the sheet body.

Owing to the innovative design, the rotor sheet provided by the present invention has the remarkable advantages of high efficiency, high performance, low noise, high rotational speed and low cost.

The present invention also provides a rotor sheet. The rotor sheet includes a sheet body with a radius of 71.4 mm, the sheet body including 8 magnetic poles symmetrically distributed in a circumferential direction of the sheet body. Each magnetic pole includes one first magnet groove 2, two second magnet grooves 4, two first air grooves 5 and one second air groove 6. Two rotor surface grooves 7 symmetrically distributed about a D-axis center line 12 are also formed in the circumference of a sheet on the outer side of each magnetic pole.

As shown in FIG. 2, the first magnet groove 2 is symmetrical about the D-axis center line 12, and a first magnet 1 is installed in the first magnet groove 2. The two first air grooves 5 are symmetrically distributed on the outer sides of two ends of the first magnet groove 2. First magnetic bridges 8 are formed between the first air grooves 5 and an excircle of the sheet body, and second magnetic bridges 9 are formed between the first magnet groove 2 and the first air grooves 5. The two second magnet grooves 4 are symmetrically distributed in an approximate V shape about the D-axis center line 12, and a second magnet 3 is installed in the two second magnet grooves 4 respectively. The second air groove 6 is positioned between the ends of the two second magnet grooves 4 near the side of the center of the sheet body. Third magnetic bridges 10 are formed between the excircle of the sheet body and the ends of the second magnet grooves 4 near the outer circumference of the sheet body, and fourth magnetic bridges 11 are formed between the second air groove 6 and the ends of the second magnet grooves 4 near the side of the center of the sheet body.

In a rotor composed of the above-mentioned sheet, the side edge, adjacent to the excircle of the sheet body, on the end of each second magnet groove 4 near the outer circumference of the sheet body is an arc line segment concentric with the excircle of the sheet body, and this side edge on the end of the second magnet groove near the outer circumference of the sheet body and the excircle of the sheet body form the third magnetic bridges 10 having an equal width. The second air groove 6 is of a trapezoidal structure and is symmetrical about the D-axis center line 12. The side edges of the second magnet groove 4, which are adjacent to the second air groove 6, are parallel to each other to form the fourth magnetic bridges 11 having an equal width. The second air groove 6 can effectively reduce a D-axis inductance without any impact on a Q-axis inductance. Therefore, a salient pole ratio of the rotor provided by the present invention is obviously larger than that of a conventional rotor, so that the design objectives of high performance and low cost can be achieved.

Figure 3:
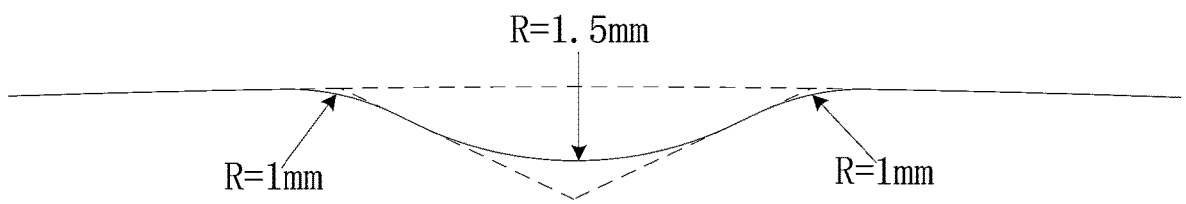
FIG. 3 is a schematic design diagram of a rotor groove.

FIG. 3 is a schematic design diagram of a rotor surface groove 7 according to the present embodiment. An initial groove is a triangular groove as shown by dotted lines in FIG. 3. An arc-shaped groove is formed by adding a fillet structure. The groove has a depth that is 0.4% to 0.6% of the radius of the sheet body, and a width that is 2% to 4% of the radius of the sheet body. Preferably, the depth is 0.35 mm, and the width is 2.1 mm. A reasonable dimensional design of the groove can effectively reduce a harmonic electromagnetic force without any adverse impact on the motor performance.

Figure 4:
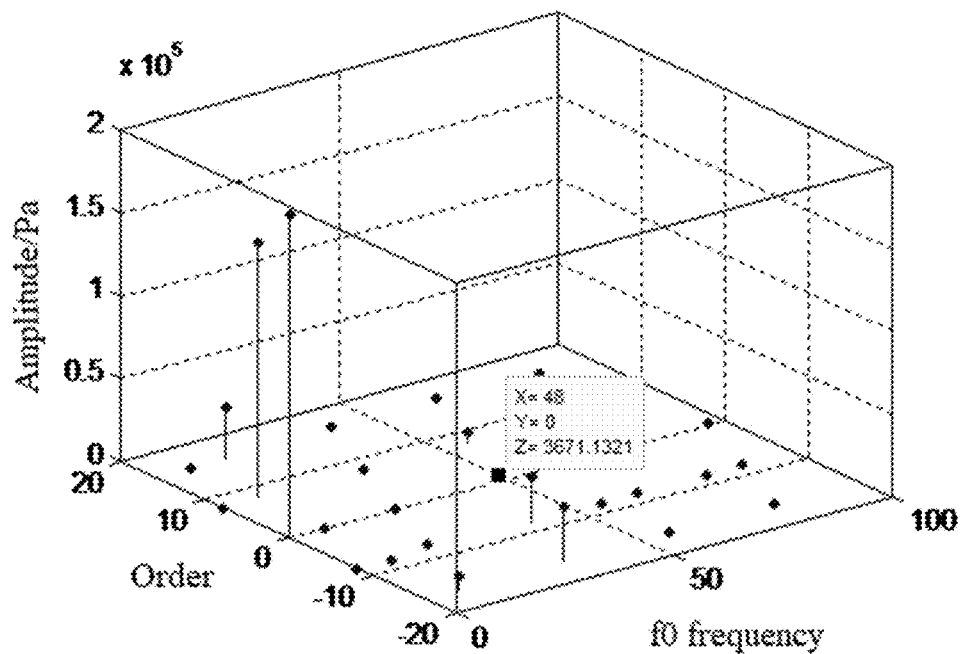
FIG. 4 is an exploded view of a radial electromagnetic force FF2 of an air gap between a stator and a rotor according to an embodiment.
Figure 5:
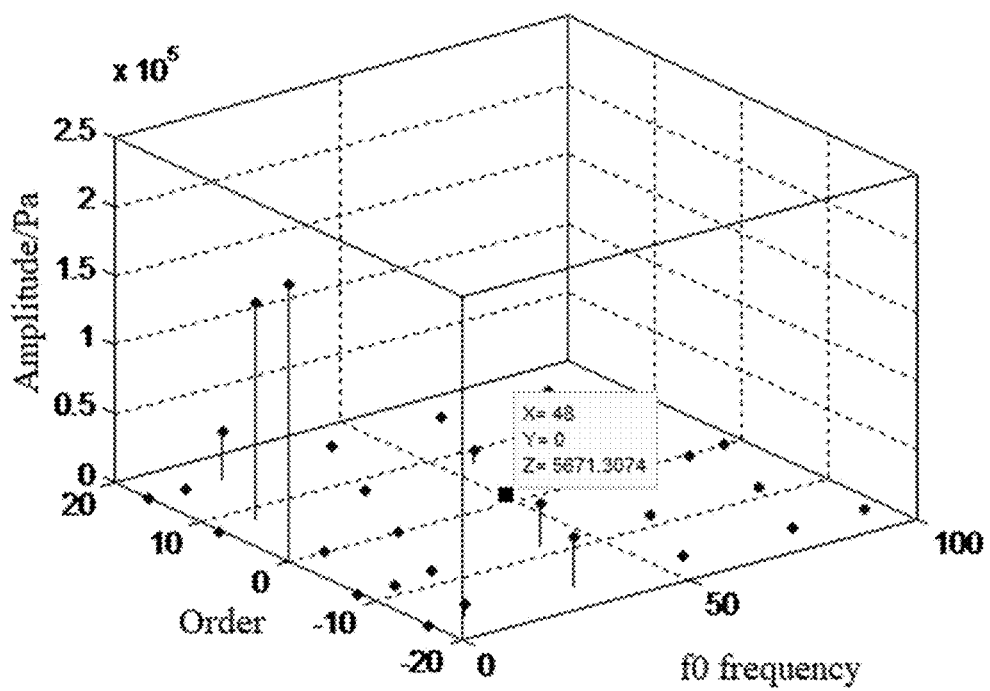
FIG. 5 is an exploded view of a radial electromagnetic force FF2 of an air gap between a stator and a rotor according to a comparative example.

In a rotor composed of the above-mentioned sheet, an angle between a connecting line from the rotor surface groove 7 to a central point of the sheet and the D-axis center line ranges from 12.5° to 13°, and is preferably 12.6°. This groove can effectively reduce a radial (0,48f) electromagnetic force of an air gap between a stator and a rotor of a motor, thus effectively eliminating the noise of the motor. FIG. 4 is an exploded view of a radial electromagnetic force FFT2 of an air gap between a stator and a rotor under a peak torque according to the present embodiment. FIG. 5 is an exploded view of a radial electromagnetic force FFT2 of an air gap between a stator and a rotor of the motor under the same working condition in an example of removing the rotor surface groove. In the present embodiment, the radial (0,48f) electromagnetic force is only 65% of that of a comparative example.

Figure 6:
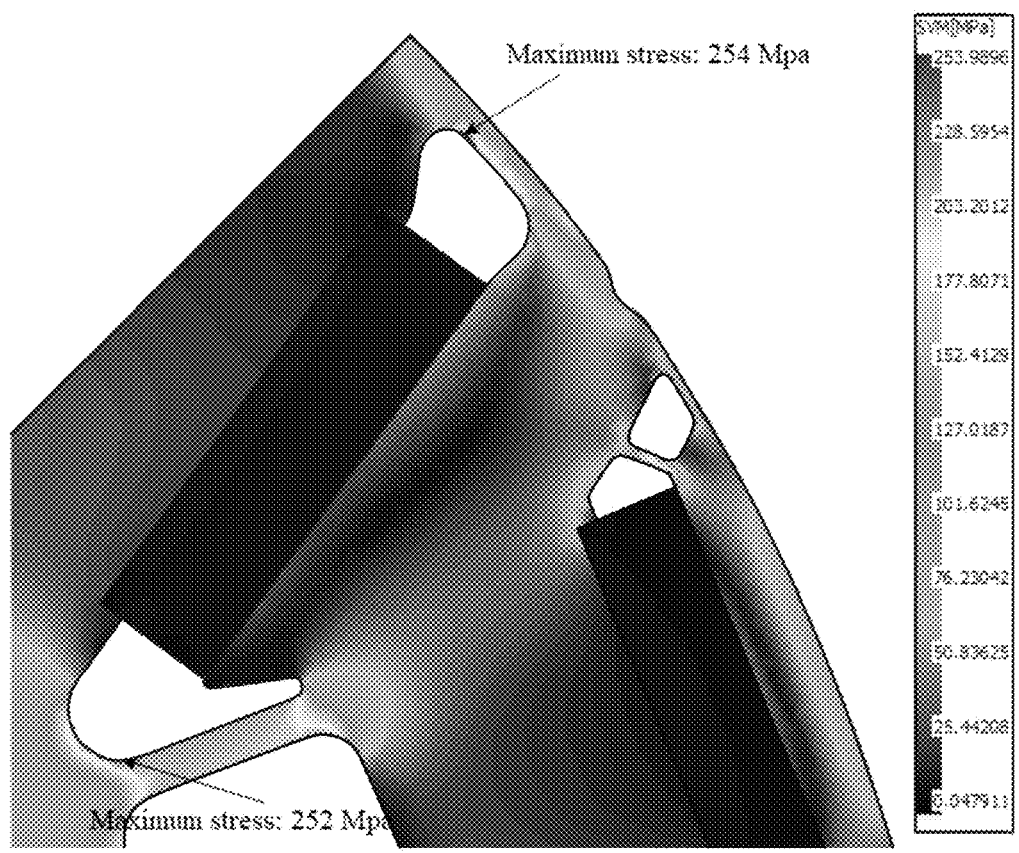
FIG. 6 is a stress nephogram according to an embodiment.
Figure 7:
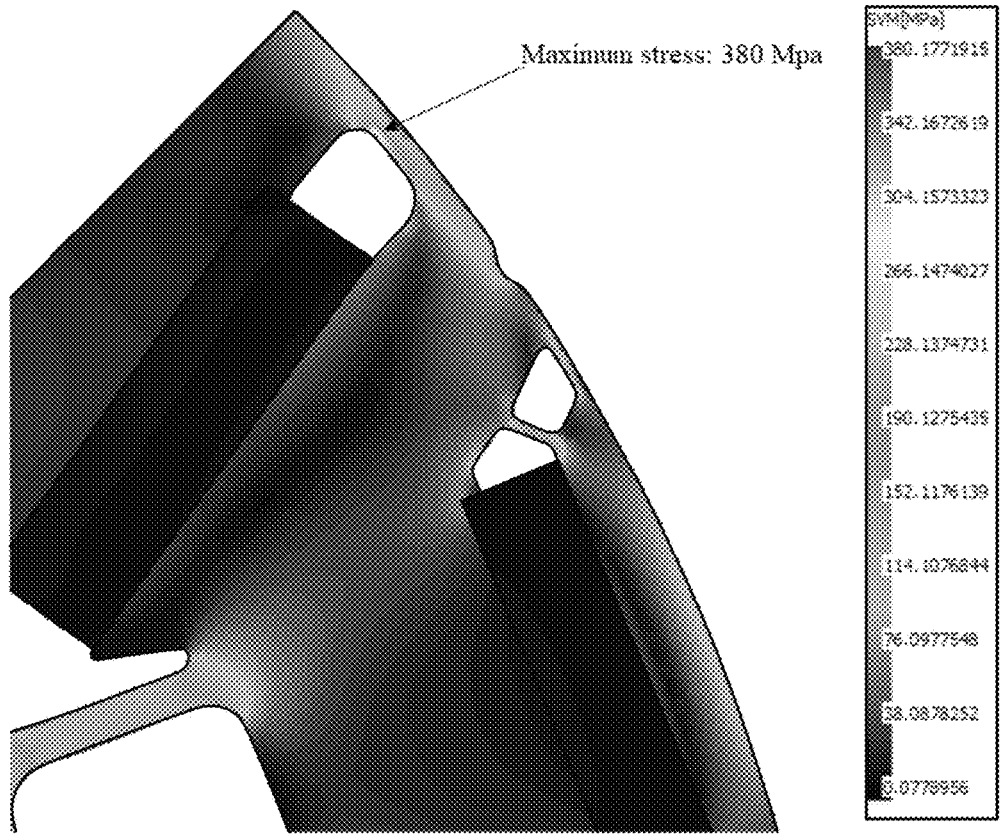
FIG. 7 is a stress nephogram of third magnetic bridges according to a comparative example.

In the rotor composed of the above-mentioned sheet, an angle 14 between a connecting line from the outermost point of the second magnet groove 4 to a central point of the sheet and the D-axis center line ranges from 20° to 21°, preferably from 20.5° to 21.5°. This angle can effectively reduce the stress of the third magnetic bridges 10, thereby reducing the width of the third magnetic bridges 10 and the flux leakage of the magnets and increasing the use ratio of the magnets. FIG. 6 and FIG. 7 respectively show stress distribution of the third magnetic bridges under the same working condition for the present embodiment and an example in which the angle is 19°. The maximum stress in the present embodiment is 254 Mpa, while that in the comparative example is 380 Mpa which is 126 Mpa higher than that in the present embodiment.

In the rotor composed of the above-mentioned sheet, the width of the fourth magnetic bridges 11 is 1.4 to 1.6 times, preferably 1.5 times, of that of the third magnetic bridges 10. An angle between two side edges of the second air groove ranges from 0 to 10°, preferably 5°. Within the meaning of the reasonable design of the angle between the connecting line from the outermost point of the second magnet groove 4 to the central point of the sheet and the D-axis center line, the third magnetic bridge 10 and the fourth magnetic bridge 11 may have equivalent stress. FIG. 6 shows stress distribution of the rotor sheet at a certain rotational speed according to the present embodiment, in which the maximum stress of the third magnetic bridges is 254 Mpa, and the maximum stress of the fourth magnetic bridges is 252 Mpa. The two maximum stresses are basically the same, thereby avoiding material waste caused by the fact that one of the magnetic bridges has excessively large stress while the other has excessively small stress.

Figure 8:
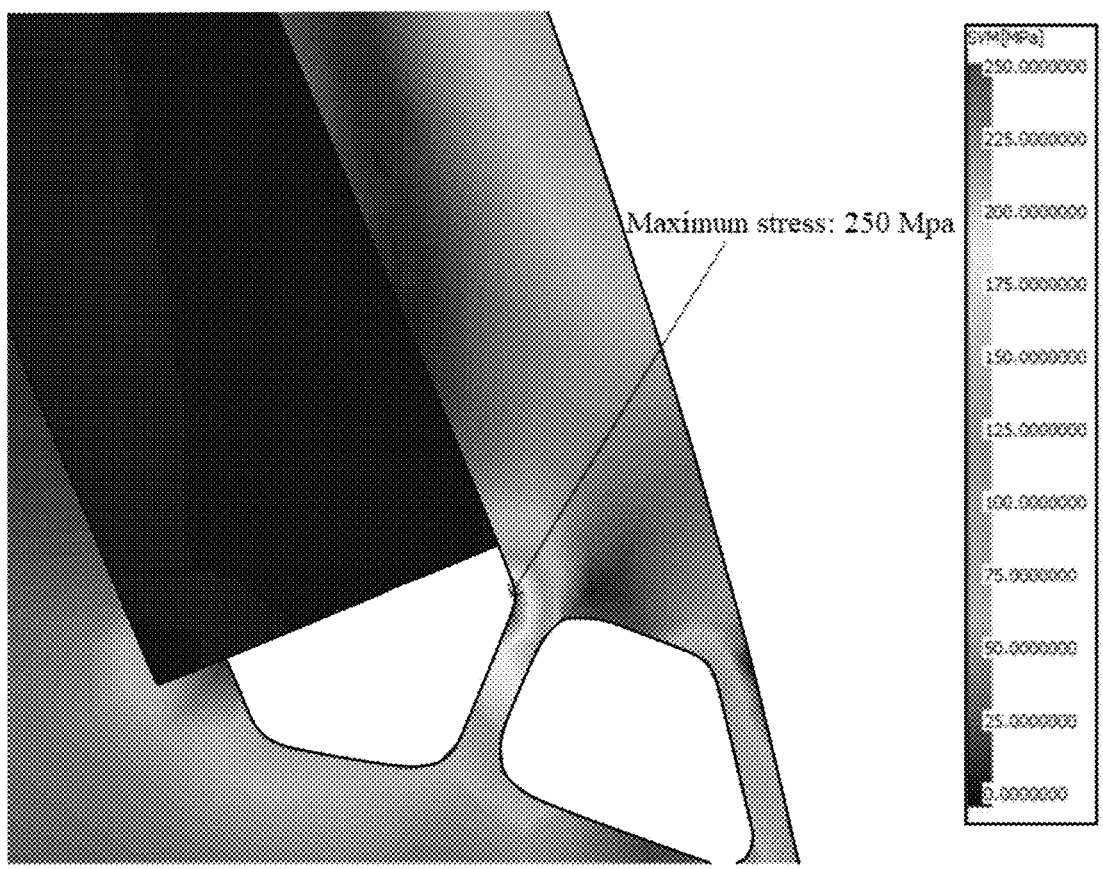
FIG. 8 is a stress nephogram of second magnetic bridges according to an embodiment.
Figure 9:
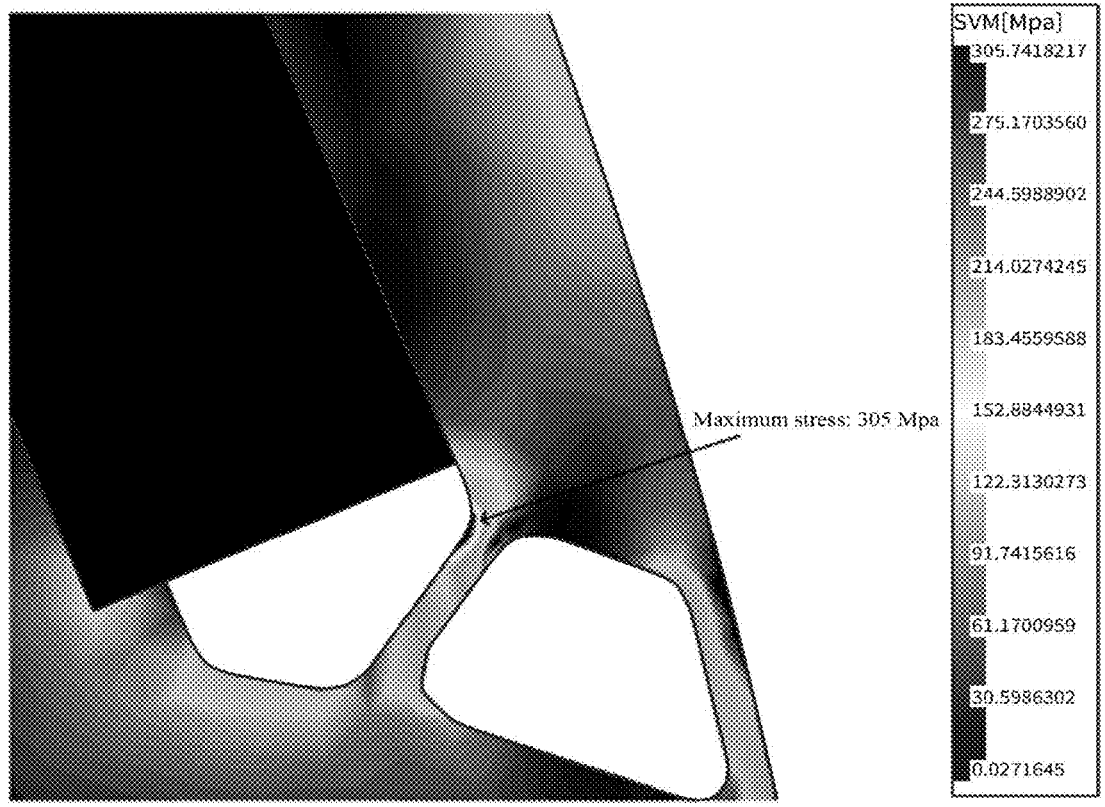
FIG. 9 is a stress nephogram of second magnetic bridges according to a comparative example.

In the rotor composed of the above-mentioned sheet, each first air groove 5 has four side edges, in which the side edge adjacent to the excircle of the sheet body is an arc line segment concentric with the excircle of the sheet body, and this side edge and the excircle of the sheet body form first magnetic bridges 8 having an equal width. The side edges of the first air grooves 5, which are adjacent to the first magnet grooves 2 are parallel to each other to form second magnetic bridges 9 having an equal width. The width of the first magnetic bridges 8 is equal to that of the second magnetic bridges 9. An angle 13 between a long edge of the second magnetic bridge 9 and a long edge of the first magnet 1 is an obtuse angle of 130° to 140°, preferably 132° to 137°, more preferably 135°, which can reduce the stress at the second magnetic bridges, thus reducing the width of the magnetic bridges while keeping the performance unchanged. Therefore, the flux leakage of the magnets is reduced, and the use ratio of the magnets is increased. FIG. 8 and FIG. 9 respectively show stress distribution of the second magnetic bridges under the same working condition for the present embodiment and an example in which the angle is 122°. The maximum stress in the present embodiment is 250 Mpa, while that in the comparative example is 305 Mpa which is 55 Mpa higher than that in the present embodiment.

In the embodiment of the present invention, line segment joints of all side edges of the first magnet groove 2, the second magnet grooves 4, the first air grooves 5, the second air grooves 6 and the rotor surface grooves 7 are additionally provided with fillet structures, wherein a fillet radius is at least 0.3 mm, which can be appropriately increased according to the dimensions of respective grooves. For example, the fillet radius R in the middle of the rotor surface groove 7 is 1.5 mm, and the fillet radius R on both sides is 1 mm.

The foregoing embodiments merely serve to illustrate technical concepts and features of the present invention, and their objective is to enable those skilled in the art to understand the content of the present invention and to implement it accordingly, but not to limit the scope of protection of the present invention. All modifications made according to the spirit essence of the main technical solution of the present invention should be included within the scope of protection of the present invention.

What is claimed is:

1. A rotor sheet, comprising a sheet body, wherein the sheet body comprises a plurality of magnetic poles distributed symmetrically in a circumferential direction of the sheet body, wherein each magnetic pole comprises one first magnet groove, two second magnet grooves, two first air grooves and one second air groove;

the one first magnet groove is symmetrical about a D-axis center line, and a first magnet is installed in the one first magnet groove; the two first air grooves are symmetrically distributed on outer sides of two ends of the one first magnet groove; first magnetic bridges are formed between the two first air grooves and an excircle of the sheet body, and second magnetic bridges are formed between the one first magnet groove and the two first air grooves; and the two second magnet grooves are symmetrically distributed in an approximate V shape about the D-axis center line, and a second magnet is installed in the two second magnet grooves respectively; the one second air groove is positioned between ends of the two second magnet grooves near a side of a center of the sheet body; third magnetic bridges are formed between the excircle of the sheet body and the ends of the two second magnet grooves near an outer circumference of the sheet body, and fourth magnetic bridges are formed between the one second air groove and the ends of the two second magnet grooves near the side of the center of the sheet body, wherein two rotor surface grooves are also formed in an outer circumference of the rotor sheet on an outer side of each magnetic pole, the two rotor surface grooves are symmetrically distributed about the D-axis center line, and each of the rotor surface grooves is positioned between one of the two first air grooves and one of the two second magnet grooves that are adjacent to each other.

2. The rotor sheet according to claim 1, wherein each of the first air grooves has four side edges, a side edge of the four side edges is adjacent to the excircle of the sheet body and is an arc line segment concentric with the excircle of the sheet body, and the side edge and the excircle of the sheet body form the first magnetic bridges having an equal width; and side edges of the two first air grooves are adjacent to the one first magnet groove, and are parallel to each other to form the second magnetic bridges having the equal width.

3. The rotor sheet according to claim 2, wherein a first angle between each of the second magnetic bridges and a long edge of the first magnet ranges from 130° to 140°.

4. The rotor sheet according to claim 3, wherein the first angle between each of the second magnetic bridges and the long edge of the first magnet ranges from 132° to 137°.

5. The rotor sheet according to claim 4, wherein the side edge, adjacent to the excircle of the sheet body, on an end of each second magnet groove near the outer circumference of the sheet body is the arc line segment concentric with the excircle of the sheet body, and the side edge on the end of each of the second magnet grooves near the outer circumference of the sheet body and the excircle of the sheet body form the third magnetic bridges having the equal width.

6. The rotor sheet according to claim 5, wherein a second angle between a connecting line from an outermost point of each of the second magnet grooves to a central point of a sheet and the D-axis center line ranges from 20.5° to 21.5°.

7. The rotor sheet according to claim 6, wherein the second angle between the connecting line from the outermost point of each of the second magnet grooves to the central point of the sheet and the D-axis center line ranges from 20.5° to 21°.

8. The rotor sheet according to claim 7, wherein the one second air groove is of a trapezoidal structure and is symmetrical about the D-axis center line, and a third angle between two side edges of the one second air groove ranges from 0 to 10°; and side edges of each of the second magnet grooves, wherein the side edges are adjacent to the one second air groove, are parallel to each other to form the fourth magnetic bridges having the equal width.

9. The rotor sheet according to claim 8, wherein the third angle between the two side edges of the one second air groove is 5°.

10. The rotor sheet according to claim 9, wherein a width of the first magnetic bridges is identical to a width of the second magnetic bridges, and a width of the fourth magnetic bridges is 1.4 to 1.6 times of a width of the third magnetic bridges.

11. The rotor sheet according to claim 8, wherein line segment joints of all side edges of the one first magnet groove, the two second magnet grooves, the two first air grooves, the one second air groove and rotor surface grooves are of fillet structures.

12. The rotor sheet according to claim 7, wherein line segment joints of all side edges of the one first magnet groove, the two second magnet grooves, the two first air grooves, the one second air groove and rotor surface grooves are of fillet structures.

13. The rotor sheet according to claim 6, wherein line segment joints of all side edges of the one first magnet groove, the two second magnet grooves, the two first air grooves, the one second air groove and rotor surface grooves are of fillet structures.

14. The rotor sheet according to claim 5, wherein line segment joints of all side edges of the one first magnet groove, the two second magnet grooves, the two first air grooves, the one second air groove and rotor surface grooves are of fillet structures.

15. The rotor sheet according to claim 4, wherein line segment joints of all side edges of the one first magnet groove, the two second magnet grooves, the two first air grooves, the one second air groove and rotor surface grooves are of fillet structures.

16. The rotor sheet according to claim 3, wherein line segment joints of all side edges of the one first magnet groove, the two second magnet grooves, the two first air grooves, the one second air groove and rotor surface grooves are of fillet structures.

17. The rotor sheet according to claim 2, wherein line segment joints of all side edges of the one first magnet groove, the two second magnet grooves, the two first air grooves, the one second air groove and rotor surface grooves are of fillet structures.

18. The rotor sheet according to claim 1, wherein the rotor surface grooves are of fillet structures.

19. The rotor sheet according to claim 1, wherein an angle between a connecting line from a midpoint of each of the rotor surface grooves to a central point of the sheet body and the D-axis center line ranges from 12.5° to 13°; and a depth of each of the rotor surface grooves is 0.4% to 0.6% of a radius of the sheet body, and a width of each of the rotor surface grooves is 2% to 4% of the radius of the sheet body.

20. The rotor sheet according to claim 1, wherein line segment joints of all side edges of the one first magnet groove, the two second magnet grooves, the two first air grooves, the one second air groove and rotor surface grooves are of fillet structures.

* * * * *